US008335638B2

(12) United States Patent
Ridenour et al.

(10) Patent No.: US 8,335,638 B2
(45) Date of Patent: Dec. 18, 2012

(54) SYSTEMS AND METHODS FOR DISPLAYING OFF SCREEN TRAFFIC

(75) Inventors: Richard D. Ridenour, Glendale, AZ (US); Peter Bobrowitz, Cave Creek, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 481 days.

(21) Appl. No.: 12/710,222

(22) Filed: Feb. 22, 2010

(65) Prior Publication Data

US 2010/0217509 A1 Aug. 26, 2010

Related U.S. Application Data

(60) Provisional application No. 61/154,195, filed on Feb. 20, 2009.

(51) Int. Cl.
*G08G 5/00* (2006.01)
*G06F 19/00* (2006.01)

(52) U.S. Cl. ............. 701/120; 701/9; 701/300; 340/945

(58) Field of Classification Search .................. 701/120, 701/117, 9, 300, 301; 340/945, 425.5, 970, 340/971; 244/180
See application file for complete search history.

(56) References Cited

U.S. PATENT DOCUMENTS

| | | | | |
|---|---|---|---|---|
| 6,473,003 | B2 * | 10/2002 | Horvath et al. | 340/945 |
| 2004/0174295 | A1 * | 9/2004 | Stayton et al. | 342/182 |
| 2007/0050129 | A1 * | 3/2007 | Salmre | 701/207 |
| 2009/0069959 | A1 * | 3/2009 | Horvath et al. | 701/8 |

* cited by examiner

*Primary Examiner* — Tan Q Nguyen

(74) *Attorney, Agent, or Firm* — Squire Sanders (US) LLP; Allen J. Moss

(57) ABSTRACT

A system according to aspects of the present invention includes a processor, a user interface (including a display) in communication with the processor, and a memory in communication with the processor. The processor executes instructions stored in the memory to present a first symbol on the display of the user interface that indicates the bearing to an off-scale vehicle, and to present a second symbol on the display that indicates the path of travel of the off-scale vehicle. The present invention provides a more accurate representation of the bearing and track of off-scale traffic compared to conventional traffic display systems.

36 Claims, 4 Drawing Sheets

SYSTEMS AND METHODS FOR DISPLAYING OFF SCREEN TRAFFIC

CROSS-REFERENCE TO RELATED APPLICATION

This application claims priority to U.S. Provisional Patent Application Ser. No. 61/154,195, filed Feb. 20, 2009, the disclosure of which is incorporated by reference in its entirety.

DESCRIPTION OF THE INVENTION

1. Field of the Invention

The present invention relates to systems and methods for displaying off screen traffic.

2. Background of the Invention

Navigation displays are increasingly used to help maneuver various types of vehicles. Navigation displays in some vehicles, particularly aircraft, have adjustable display ranges that allow a user (such as the pilot) to change the size of the area being displayed. These displays often have small range settings (less than 1 nautical mile) that allow the pilot to "zoom in" to a small area to display. Navigation displays in aircraft can also be used to provide a Cockpit Display of Traffic Information (CDTI) function, which presents information regarding surrounding traffic to the flight crew.

The current CDTI Minimum Operational Performance Standards (MOPS) in the United States is specified in RTCA DO-317 "Minimum Operational Performance Specification (MOPS) for Aircraft Surveillance Applications Systems (ASAS)," which is incorporated herein by reference in its entirety. The CDTI MOPS for the U.S. suggests that any off-scale traffic (i.e. traffic located beyond the boundaries of the display area) should be projected along its relative bearing from ownship (i.e. the vehicle on which the navigation system providing CDTI resides). This ensures that if the pilot sees a traffic icon at, for instance, the two o'clock position on the display then the actual aircraft will be at the two o'clock position out the window. While this is a good design in the airborne environment where there is no underlying map display, it can lead to misleading presentations when a surface map is also displayed. The present invention addresses this, and other issues.

SUMMARY OF THE INVENTION

The present invention provides a more accurate representation of the bearing and track of off-scale traffic compared to conventional traffic systems. A system according to aspects of the present invention includes a processor, a user interface (including a display) in communication with the processor, and a memory in communication with the processor. The processor executes instructions stored in the memory to present a first symbol on the display of the user interface that indicates the bearing to an off-scale vehicle, and to present a second symbol on the display that indicates the path of travel of the off-scale vehicle.

A computer-readable medium according to the present invention stores instructions that, when executed by a provided processor, cause the processor to present a first symbol on the display of the user interface that indicates the bearing to an off-scale vehicle, and to present a second symbol on the display that indicates the path of travel of the off-scale vehicle.

Both the foregoing summary and the following detailed description are exemplary and explanatory only and are not restrictive of the invention.

BRIEF DESCRIPTION OF THE DRAWINGS

A more complete understanding of the present invention may be derived by referring to the detailed description and claims when considered in connection with the following illustrative figures.

DESCRIPTION OF THE EMBODIMENTS

Reference will now be made in detail to the present exemplary embodiments of the invention, examples of which are illustrated in the accompanying drawings.

Exemplary System

Figure 1:
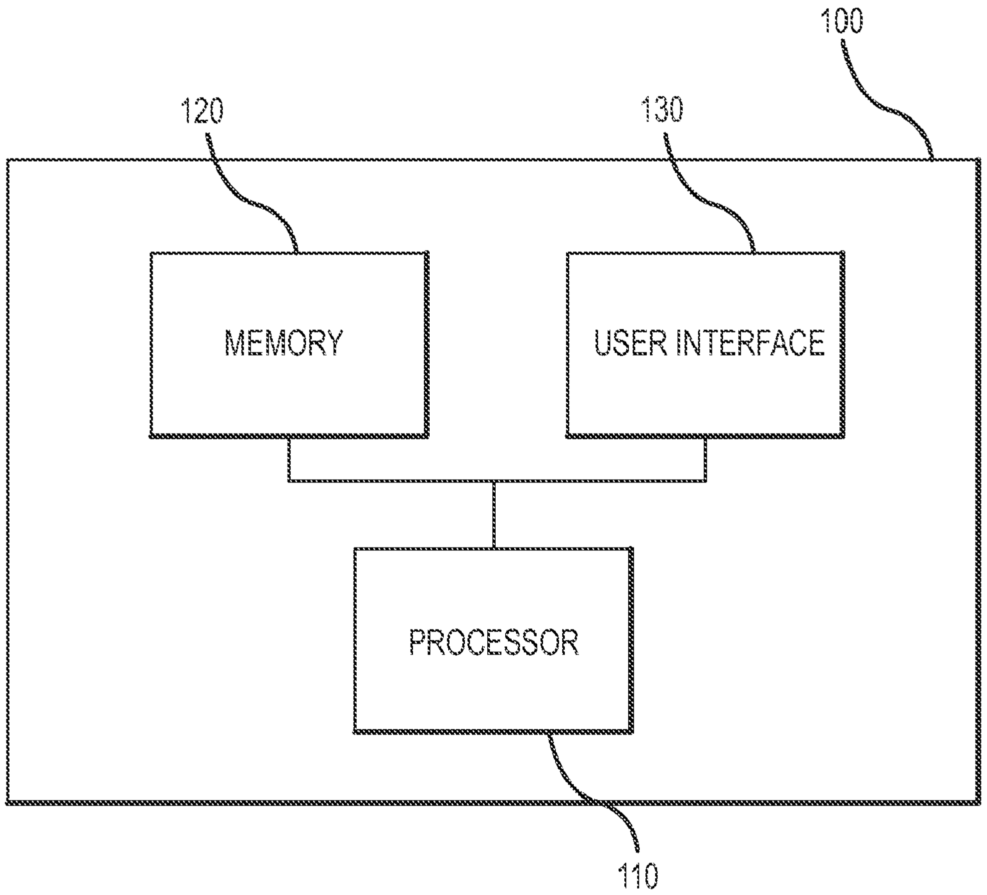
FIG. 1 is a block diagram of an exemplary system according to various aspects of the present invention.

FIG. 1 depicts an exemplary system 100 according to various aspects of the present invention. The system 100 includes a processor 110 in communication with a memory 120 and a user interface 130. The system 100 may include, or operate in conjunction with, any number of other systems and devices, such as a TCAS, ADS-B system, and/or a general-purpose or special-purpose computer system. The components of the exemplary system 100 may be distributed across any number of different systems and devices, and need not be physically connected to each other. The system 100 may be located onboard a vehicle. The components of the system 100 may communicate with each other as desired, as well as with any other system or device. The system 100 may additionally include (or communicate with) any other appropriate components.

The processor 110 retrieves and executes instructions stored in the memory 120 to control the operation of the system 100. Any number and type of processor(s) such as an integrated circuit microprocessor, microcontroller, and/or digital signal processor (DSP), can be used in conjunction with the present invention.

The memory 120 stores instructions, information received from one or more data sources, and any other suitable information. The memory 120 operating in conjunction with the present invention may include any combination of different memory storage devices, such as hard drives, random access memory (RAM), read only memory (ROM), FLASH memory, or any other type of volatile and/or nonvolatile memory. Any number of memory storage devices of any size and configuration may also be used in conjunction with the present invention.

The user interface 130 receives input from, and displays output to, one or more users, such as an operator of a vehicle on which the system is located (such as the pilot of an aircraft). The user interface 130 can also present information received from any suitable data source, including any system, device, vehicle, or other entity capable of providing information for use with systems and methods of the present invention. Such information may be of any type and in any format, and may include, or be used to determine spatial information (e.g., bearing, range, position, velocity) for an off-scale vehicle, as well as for other purposes. Systems and methods of the present invention can receive such information in any manner. For example, information can be provided wirelessly from a data source to a system or device implementing methods in accordance with the present invention (such as system 100). Such information can be provided on any frequency (or combination of frequencies), in any format, and using any communication protocol.

The user interface 130 may include any number of suitable systems or devices to display information and receive various inputs. The user interface 130 may include one or more visual displays (also referred to herein as “monitors,” and/or “screens”) and/or speakers to communicate information to a user. A user can provide input to the user interface 130 through a mouse, keyboard, touchpad, microphone, or any number of other input devices.

Exemplary Method

Any combination and/or subset of the elements of the methods depicted herein may be practiced in any suitable order and in conjunction with any suitable system, device, and/or other method. The methods described and depicted herein can be implemented in any suitable manner, such as through software operating on system 100. The software may comprise computer-readable instructions stored in a medium (such as the memory 120) and can be executed by one or more processors (such as processor 110) to perform the methods of the present invention.

Figure 2:
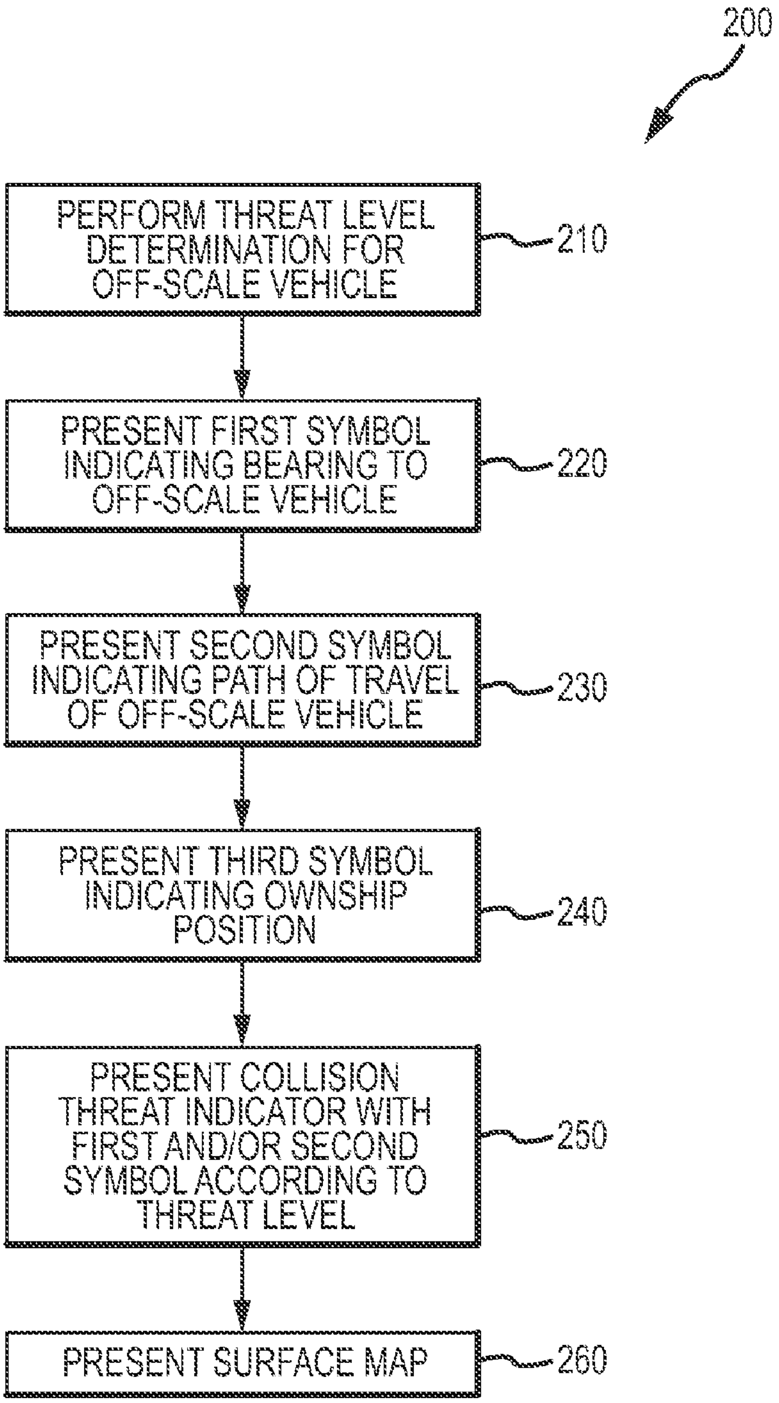
FIG. 2 is a flow diagram of an exemplary method according to various aspects of the present invention.

FIG. 2 depicts an exemplary method 200 according to various aspects of the present invention. In this exemplary method, a threat level determination is performed (210). A first symbol is presented (e.g., on a display screen or other visual output device of a user interface) to indicate the bearing from ownship to an off-scale vehicle (220). A second symbol is presented to indicate the path of travel of the off-scale vehicle (230), while a third symbol is presented to indicate the position of ownship (240). Presentation of the first and/or second symbols can be displayed for some or all off-scale traffic. For example, the present invention may only display first and second symbols for off-scale traffic within a predetermined distance from ownship, or for off-scale traffic for whose determined threat level meets or exceeds a predetermined threshold. Among other things, this allows the display of excessive and/or less relevant traffic to be avoided in favor of displaying traffic that is more likely to interfere with the navigation of ownship. The exemplary method 200 also includes displaying a collision threat indicator (250) in conjunction with the first and/or second symbol, and presenting a surface map (260).

In accordance with the present invention, a threat level determination is made with regards to an off-scale vehicle (210). The threat level determination can be made in any suitable manner by any system or device operating in conjunction with the present invention, such as a TCAS. In one exemplary embodiment of the present invention, the threat level for an off-scale vehicle is classified into three categories: non-threat, potential threat, and threat. As discussed in more detail below, the first and/or second symbol can be presented along with a collision threat indicator representative of the determined threat level. Embodiments of the present invention can make threat level determinations based on whether a threat of collision exists between ownship and any type of vehicle. Among other things, this allows systems and methods of the present invention to identify a variety of potential off-scale collision threats.

Figure 3A:
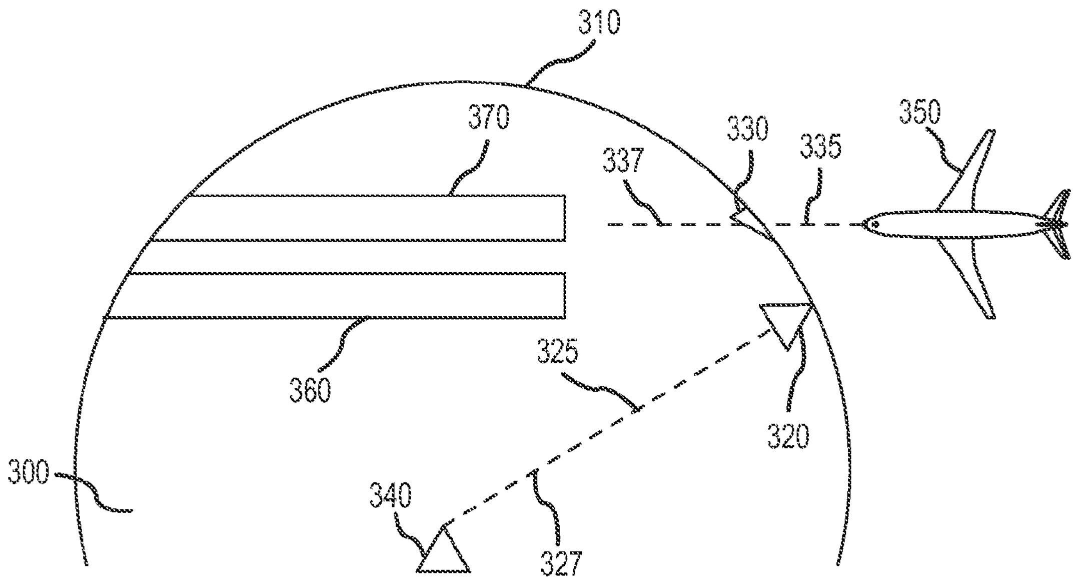
FIGS. 3A and 3B depict exemplary displays of off-scale traffic according to various aspects of the present invention.

A first symbol is presented to indicate the bearing from ownship to an off-scale vehicle (220), while a second symbol is presented to indicate the path of travel of the off-scale vehicle (230) and a third symbol is presented to indicate the position of ownship (240). In one exemplary embodiment, referring now to FIG. 3A, a display area 300 is defined by boundary 310, which is a semi-circle around the symbol representing the position of ownship 340. A first symbol 320 is presented along the bearing 325 from ownship 340 to the off-scale vehicle 350, while a second symbol 330 is presented within the display area and along the path of travel 335 of the off-scale vehicle 350. Among other things, the present invention provides a more accurate indication than conventional systems of where an off-scale vehicle is travelling, which can help avoid collisions. In the example depicted in FIG. 3A, for instance, a pilot viewing a conventional CDTI display (i.e., one that only presented an indicator of the relative bearing from ownship 340 to the off-scale vehicle 320) might conclude that the off-scale vehicle 350 is attempting to land on lower runway 360. The present invention, by contrast, clearly indicates that the path of the off-scale vehicle 350 is aligned with the upper runway 370.

The first symbol may be of any size, shape, color, and configuration to indicate the bearing to an off-scale vehicle. Likewise, the second symbol may be of any size, shape, color, and configuration to indicate the path of travel of the off-scale vehicle. In the exemplary embodiment depicted in FIG. 3A, the first, second, and third symbols are angular to show the facing of the ownship (symbol 340), the bearing 325 to the off-scale vehicle 350 (symbol 320), and the path of travel 335 of the off-scale vehicle 350 (symbol 330). The first and/or second symbol may also have any size, shape, color, and configuration for indicating the type of the off-scale vehicle 350. In this context, a “vehicle type” may include any information that can distinguish the vehicle from other vehicles, such as: whether the vehicle is a land, air, or sea vehicle; the vehicle’s manufacturer; one or more identifiers for the vehicle (such as a flight number or model number); and/or the size or mass of the vehicle.

In an exemplary embodiment, the first symbol 320 includes a bearing pointer 327 to help further illustrate the bearing 325 from ownship 340 to the off-scale vehicle 350. Similarly, the second symbol 330 may include a track line 337 to help depict the path of travel 335 of the off-scale vehicle 350. In one embodiment, a user of the present invention may selectively display and hide bearing pointer 327 and/or track line 337. This can help a user (such as a pilot) to locate an off-scale vehicle visually, as well as to determine the path of travel of an off-scale vehicle 350, while also allowing the pilot to hide the bearing pointer 327 and/or track line 337 to avoid cluttering the display.

The first symbol 320 and second symbol 330 can be displayed anywhere in relation to the display area 300. In the exemplary embodiments depicted in FIGS. 3A and 3B, symbols 320, 330, 382 and 384 are all presented adjacent to the display area boundary 310 and within the display area 300. However, such symbols could be presented anywhere within, or outside of, the display area 300. In one exemplary embodiment, the first symbol 320 and second symbol 330 can be displayed outside the boundary 310 to indicate an off-traffic vehicle is relatively far away from ownship 340. Any number of off-scale vehicles can be represented using pairs of first and second symbols for each vehicle.

The display area 300 may be any size, shape, or configuration, and any suitable aspect of the display area 300 can be configured (e.g., automatically, or in response to input from a user through a user interface operating in conjunction with the present invention). For example, in one embodiment of the present invention a user provides input through an input device of a user interface to selectively expand and contract (i.e., “zoom out” and “zoom in”) the range of the display area. In this context, a “display area” 300 may include any two-dimensional representation or three-dimensional representation of a volume. The exemplary display area 300 in FIG. 3A, for instance, is a semi-circular, two-dimensional representation of a volume of space around ownship 340. In other embodiments of the present invention, the display area may be circular, spherical, hemispherical, or any other desired shape. The display area 300 need not be centered on any particular vehicle or object, but can be bounded based on any desired point(s) in space.

The first symbol and second symbol may each include a common visual indicator to show the first and second symbols relate to the same off-scale vehicle. Any desired visual indicator may be used to show this relationship, such as a color, a shading, a shape, a size, a number, and/or a character. Where a plurality of off-scale vehicles are represented, the common visual indicator for the pair of symbols corresponding to one off-scale vehicle may be distinct from the common visual indicators for any other off-scale vehicle.

Figure 3B:
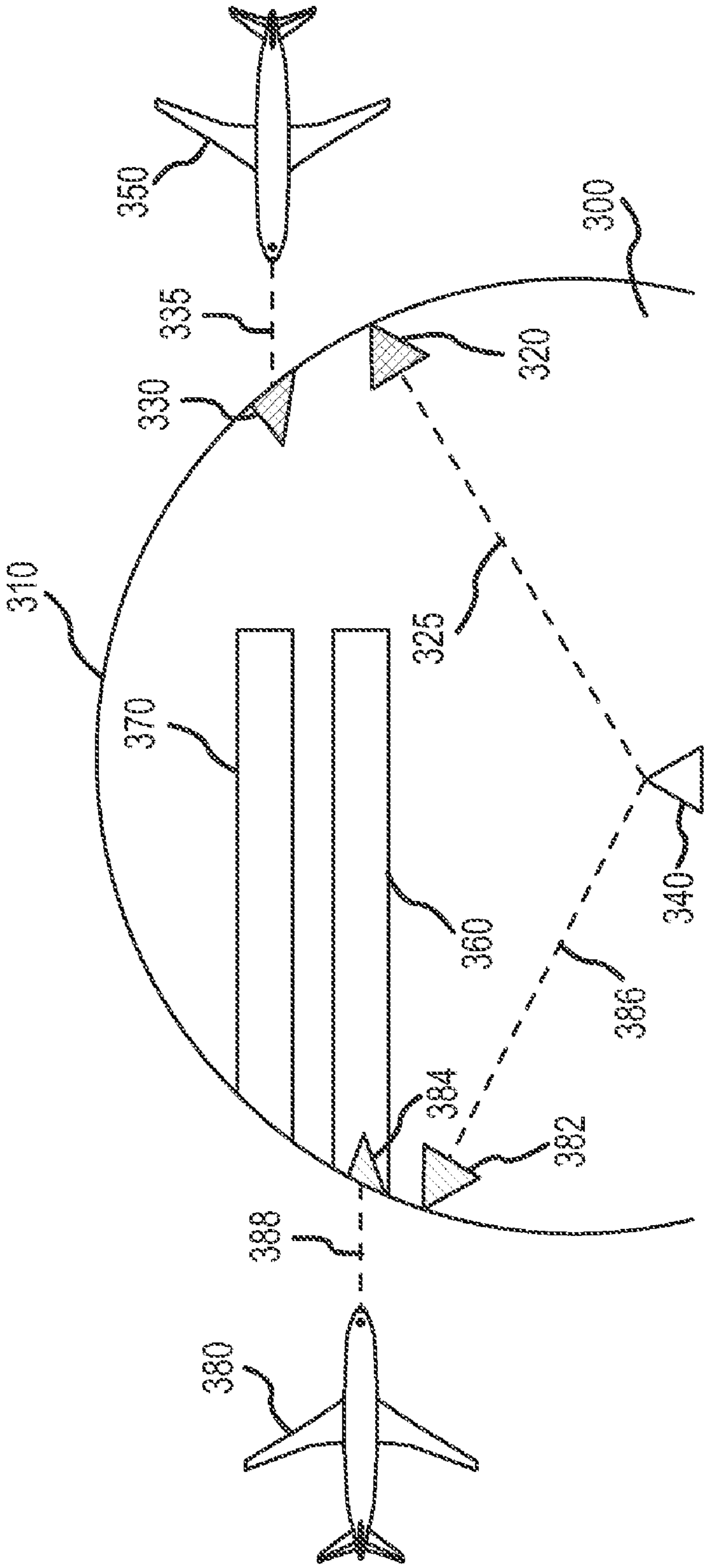

Referring to FIG. 3B, for example, symbols 320 and 330 (corresponding to off-traffic vehicle 350) both include a common visual indicator (a first type of shading), while symbols 382 and 384 (corresponding to a second off-traffic vehicle 380) both include a second type of shading that is different from the shading of symbols 320 and 330. Symbol 382 is located along the bearing 386 between ownship 340 and vehicle 380, while symbol 384 is located along the path of travel 388 of the vehicle 380.

The exemplary method 200 includes presenting a collision threat indicator in conjunction with the first symbol 320 and/or second symbol 330. Any number and type of collision threat indicators may be used in conjunction with the present invention, including a shading, shape, size, number, and character. The collision threat indicator may be based on a threat level determined by any system or device operating in conjunction with the present invention. In one exemplary embodiment, the collision threat indicator is one of three colors: cyan (representing a non-threat), yellow (representing a potential threat), and red (representing a threat). Either or both the first and second symbol may include the collision threat indicator. The collision threat indicator may be presented in conjunction with other (visual and/or aural) messages, warnings, alerts, and other information through a user interface. For example, the collision threat indicator may be presented in conjunction with a visual or audible alert issued to an operator of the vehicle, as well as to an individual external to the vehicle (such as an air traffic controller).

In one exemplary embodiment of the present invention, the first symbol 320 and second symbol 330 are only displayed when the threat level determination for the corresponding off-scale vehicle meets or exceeds a predetermined threshold. For example, in the case where a system of the present invention utilizes three threat levels (nonthreat, potential threat, and threat), the first symbol 320 and second symbol 330 for an off-scale vehicle may only be displayed if the threat level for the vehicle exceeds the "nonthreat" level (i.e., the vehicle is determined to be a potential threat or threat).

The exemplary method 200 includes displaying a surface map (260). The surface map can illustrate information regarding any man-made or natural feature, including roads (including runways, taxiways, railroads, and highways), surface topography, structures, waterways, and/or any other feature of interest to the navigation of ownship or another vehicle. Information for presenting the surface map, as well as other Information of interest to the navigation of a vehicle (such as weather data) may be generated, and stored by, systems and devices acting in accordance with the present invention. Such information can also be provided from any suitable data source. In one exemplary embodiment of the present invention, the display of geographical features of (and surrounding) an airport (e.g.—runways, hold lines, terminals, structures, and undeveloped land) in conjunction with the first symbol and second symbol corresponding to an off-scale vehicle can help a pilot to accurately determine the location and path of travel of the off-scale vehicle to help avoid collisions.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A system comprising:

(a) a processor;

(b) a user interface in communication with the processor, the user interface including a display; and (c) a memory in communication with the processor and storing instructions that, when executed by the processor, cause the processor to:

(1) present, using the display of the user interface, a first symbol for indicating a bearing to an off-scale vehicle; and (2) present, using the display of the user interface, a second symbol for indicating a path of travel of the off-scale vehicle.

2. The system of claim 1, wherein the memory further stores instructions to cause the processor to present a surface map using the display of the user interface.

3. The system of claim 2, wherein the surface map includes at least one of:

a road;

surface topography;

a waterway; and a structure.

4. The system of claim 1, wherein the memory further stores instructions to cause the processor to present, using the display of the user interface, a third symbol for indicating ownship position.

5. The system of claim 1, wherein the first symbol and the second symbol each include a common visual indicator.

6. The system of claim 5, wherein the common visual indicator includes at least one of: a color, a shading, a shape, a size, a number, and a character.

7. The system of claim 1, wherein at least one of the first symbol and the second symbol includes a collision threat indicator.

8. The system of claim 7, wherein the collision threat indicator includes one or more of: a color, a shading, a shape, a size, a number, and a character.

9. The system of claim 7, wherein the memory further stores instructions to cause the processor to:

(a) perform a threat level determination for the off-scale vehicle; and (b) present the collision threat indicator in accordance with the threat level determination.

10. The system of claim 1, wherein at least one of the first symbol and the second symbol includes an indicator of a type of the off-scale vehicle.

11. The system of claim 1, wherein the first symbol includes a bearing pointer extending at least partially along the bearing between ownship and the off-scale vehicle.

12. The system of claim 1, wherein the second symbol includes a track line extending at least partially along the path of travel of the off-scale vehicle.

13. The system of claim 1, wherein at least one of the first symbol and the second symbol is presented adjacent to a boundary of a display area represented on the display of the user interface.

14. The system of claim 13, wherein at least one of the first symbol and the second symbol is presented within the display area.

15. The system of claim 13, wherein at least one of the first symbol and the second symbol is presented outside of the display area.

16. The system of claim 13, wherein the display area is configurable by a user through the user interface.

17. The system of claim 1, wherein the memory further stores instructions to cause the processor to provide aural information using the user interface.

18. The system of claim 1, wherein the memory further stores instructions to cause the processor to:

(a) perform a threat level determination for the off-scale vehicle; and (b) present the first symbol and the second symbol only if the threat level determination exceeds a predetermined threshold.

19. A computer-readable medium storing instructions that, when executed by a provided processor, cause the processor to:

(a) present, using a display of a provided user interface, a first symbol for indicating a bearing to an off-scale vehicle; and;

(b) present, using the display of the user interface, a second symbol for indicating a path of travel of the off-scale vehicle.

20. The medium of claim 19, wherein the memory further stores instructions to cause the processor to present a surface map using the display of the user interface.

21. The medium of claim 20, wherein the surface map includes at least one of:

a road;

surface topography;

a waterway; and a structure.

22. The medium of claim 19, wherein the medium further includes instructions to cause the processor to present, using the display of the user interface, a third symbol for indicating ownship position.

23. The medium of claim 19, wherein the first symbol and the second symbol each include a common visual indicator.

24. The medium of claim 23, wherein the common visual indicator includes at least one of: a color, a shading, a shape, a size, a number, and a character.

25. The medium of claim 19, wherein at least one of the first symbol and the second symbol includes a collision threat indicator.

26. The medium of claim 25, wherein the collision threat indicator includes one or more of: a color, a shading, a shape, a size, a number, and a character.

27. The medium of claim 25, wherein the medium further stores instructions to cause the processor to:

(a) perform a threat level determination for the off-scale vehicle; and (b) present the collision threat indicator in accordance with the threat level determination.

28. The medium of claim 25, wherein at least one of the first symbol and the second symbol includes an indicator of a type of the off-scale vehicle.

29. The medium of claim 19, wherein the first symbol includes a bearing pointer extending at least partially along the bearing between ownship and the off-scale vehicle.

30. The medium of claim 19, wherein the second symbol includes a track line extending at least partially along the path of travel of the off-scale vehicle.

31. The medium of claim 19, wherein at least one of the first symbol and the second symbol is presented adjacent to a boundary of a display area represented on the display of the user interface.

32. The medium of claim 31, wherein at least one of the first symbol and the second symbol is presented within the display area.

33. The medium of claim 31, wherein at least one of the first symbol and the second symbol is presented outside of the display area.

34. The medium of claim 31, wherein the display area is configurable by a user through the user interface.

35. The medium of claim 19, wherein the medium further stores instructions to cause the processor to provide aural information using the user interface.

36. The medium of claim 19, wherein the medium further stores instructions to cause the processor to:

(a) perform a threat level determination for the off-scale vehicle; and (b) present the first symbol and the second symbol only if the threat level determination exceeds a predetermined threshold.

* * * * *